HEADER FOR A CAPSULE FOR A SEMICONDUCTOR ELEMENT OR THE LIKE

Original Filed Aug. 19, 1963

3,351,700

HEADER FOR A CAPSULE FOR A SEMICONDUCTOR ELEMENT OR THE LIKE

Unto U. Savolainen, Attleboro, and Alan M. Huntress, Norton, Mass., assignors to Texas Instruments Incorporated, Dallas, Tex., a corporation of Delaware Continuation of application Ser. No. 302,869, Aug. 19, 1963. This application Nov. 10, 1966, Ser. No. 593,588
3 Claims. (Cl. 174—50.56)

ABSTRACT OF THE DISCLOSURE

A capsule for a semiconductor device or the like has a header comprising a composite multilayered cup having an inner layer of a metallic glass-sealing material, an intermediate metallic core layer of a material (e.g., copper) having a relatively high thermal conductivity in relation to the glass-sealing material, and an outer layer of the same glass-sealing material. The layers are metallurgically bonded together. A mass of glass in the cup adhered to the inner layer seals in place a conductor extending through the cup into the capsule, the material of the inner and outer layers having a thermal coefficient of expansion which closely matches that of the glass.

This application is a continuation of application Ser. No. 302,869, filed Aug. 19, 1963, now abandoned.

This invention relates to headers for capsules for semiconductor elements or the like, and more particularly to such a header which embodies glass-sealing material.

Semiconductor elements, such as transistors and diodes, are often hermetically sealed in a metallic capsule for their protection. Such a capsule may, for example, comprise a so-called header or base which carries the semiconductor element (e.g., a wafer) and a cup-shaped cover for the semiconductor element which is hermetically sealed to the base. The base closes the open end of the cover and has an opening or openings for passage of terminals or leads for the semiconductor element. The base may be in the form of an eyelet, for example, bonded to the cover at the open end of the cover in suitable manner to form a hermetic seal between the cover and the base. Where the leads extend through the base, a hermetic seal is provided by means of a sealant, usually a sealing glass, although other types of sealants, including other vitreous or ceramic sealants, may be used. Various sealing glasses for this purpose are well known.

With particular regard to capsules as above described, it is desirable that the eyelet comprise a material, called a glass-sealing material, to which the sealing glass is strongly adherent despite expansion and contraction of the eyelet and glass as may occur upon heating and cooling of the eyelet and glass due to heating and cooling of the device. Such heating and cooling may result for example, (1) during processing and manufacture of the device, (2) from environmental ambient temperature conditions during the application life of the device and (3) from heat generated by the device itself during operation. Further, it may be desirable that the eyelet be capable of effectively conducting away and dissipating heat generated by the semiconductor device.

Certain alloys having special characteristics adapting them for use as glass-sealing materials are known. One of these, for example, is an iron-cobalt-nickel alloy sold under the trademark Kovar, which consists of 29% nickel, 17% cobalt aand the balance iron. While this performs well for sealing purposes, it has certain disadvantages such as the disadvantage of relatively low thermal conductivity (which is generally the case with other alloys which may be used as glass-sealing material). For example, Kovar has been stated to have a thermal conductivity of 0.046 cal./sq. cm./cm./° C./sec., compared with a thermal conductivity of 0.94 for copper, 0.22 for nickel, and 0.14 for low carbon steel. It also has the disadvantage of being relatively expensive.

Consideration has been given to using Kovar clad on one side with copper, for example, to utilize its desirable characteristic as a sealing material for glass and the high thermal conductivity characteristic of copper, but it has been found that use of such a composite material has led to considerable difficulties, particularly on account of the processing needed for preparing the Kovar for bonding thereto of the glass.

Accordingly, among the several objects of the invention may be noted the provision of an improved header which is of composite multi-layered construction embodying a glass sealing alloy such as Kovar or the like and one or more additional metal components offsetting the disadvantages of the glass sealing alloy, without deleteriously affecting the sealing ability of the alloy, and which may be processed without difficulty. In this regard, it will be understood that combinations of various metals with Kovar or an equivalent glass-sealing alloy may be used. For example, where relatively high thermal conductivity is desired, a combination of the glass-sealing alloy and copper (which is a very good heat conductor) may be used. The combination of the glass-sealing alloy with copper reduces the amount of the alloy required, and thus also reduces the cost of the material in relation to solid Kovar or the like. Another object of the invention is the provision of such headers which may be made from composite multi-layered sheet stock (including strip as well as wide sheet form) capable of being readily formed into the headers and processed without difficulty for adherence thereto of the sealing glass, capable of effective heat dissipation and in some applications advantageously without use of elaborate heat sinks or other auxiliary heat-dissipating means, and adapted to maintain a hermetic seal around the leads despite expansion and contraction of the parts. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, FIG. 1 is a view in perspective of a composite glass-sealing material in sheet form according to an example of this invention, with thicknesses greatly exaggerated, and with part of the sheet broken away and shown in section;

Corresponding reference characters indicate corresponding parts through the several views of the drawings.

Figure 1:
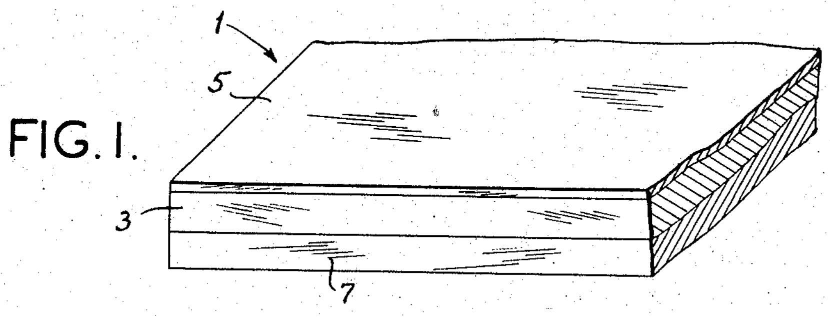

Referring to FIG. 1 of the drawings, there is indicated at 1 sheet of composite glass-sealing material made in accordance with this invention. The term "sheet" is intended to cover strip as well as relatively wide sheet material. As shown, the sheet 1 comprises a layer of copper 3 clad on one side with a layer 5 of a glass-sealing alloy such as Kovar and on the other side with a layer 7 of the same alloy. When Kovar is used, this material may be referred to as double-clad Kovar on copper or copper-cored Kovar composite material.

The term "copper" as used herein, includes alloys of copper.

The sheet 1 may be made in any suitable manner which effects bonding together of the layers 5, 3 and 7, preferably with a metallurgical bond. It may be made, for example, by solid phase bonding techniques such as disclosed in United States Patents 2,691,815 or 2,753,623.

As appears in FIG. 1, layer 5 of Kovar is shown relatively thin in relation to layers 3 and 5. For example, in this unbalanced layer form of the material, the thickness proportion of layers 5, 3 and 7 may be respectively on the order of 10/50/40, and a typical total thickness for the sheet 1 is 0.0155 inch.

Figure 2:
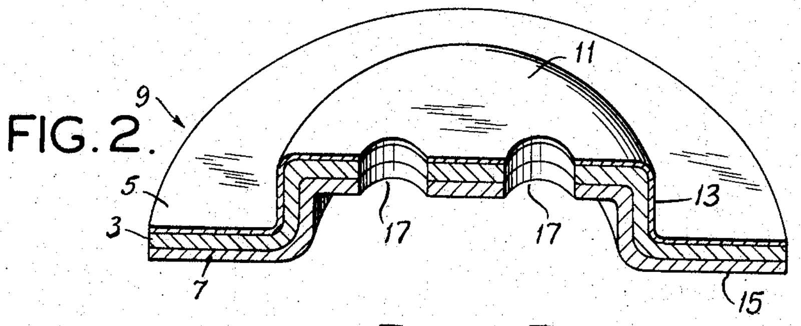
FIG. 2 is a perspective in half-section of a header or eyelet stamped from the FIG. 1 material, on a smaller scale than FIG. 1 but thicknesses still being exaggerated.

The double-clad Kovar on copper composite sheet 1 constitutes sheet metal stock from which may be stamped out headers or eyelets 9 as shown in FIG. 2. Header 9 appearing in FIG. 2 is of shallow inverted cup shape or hat shape, having a generally flat circular crown 11, an annular generally cylindric wall 13 extending down from the periphery of the crown, and an outwardly extending generally flat annular flange or rim 15 at the lower end of the wall 13. Crown 11 may have one or more openings 17 for the passage of semiconductor leads, two openings being shown by way of example. The header is stamped out from sheet 1 in such manner that the thin Kovar layer 5 is on the upper surface of crown 11 and rim 15 as viewed in FIG. 2 and on the outside of wall 13 thus constituting the outer layer of the cup. Layer 7 constitutes the inner layer of the cup.

Header 9 may be processed for production of a sound gas-free seal of sealing glass to the Kovar layer 7, for example, by firing the header in wet hydrogen for about thirty minutes at about 1000° C., and subsequently heating the header to above 650° C. in a slightly oxidizing atmosphere. This creates an oxidized surface on the Kovar layer 7 to which sealing glass may be sealed at an elevated temperature with a gas-free seal. The copper layer 3, being clad on both sides with Kovar, is substantially fully protected during this processing. If the copper were clad with Kovar only on one side, the exposed copper face would be badly oxidized, resulting in undesirable flaking off of copper oxide. Also, there would be a tendency for the copper to blister badly during the 1000° C. wet hydrogen treatment. Also, cleaning of the Kovar and copper oxide after glass sealing preparatory to gold plating (which is a standard finish for semiconductor applications) would be difficult. These problems are avoided by use of the double-clad Kovar on copper.

Figure 3:
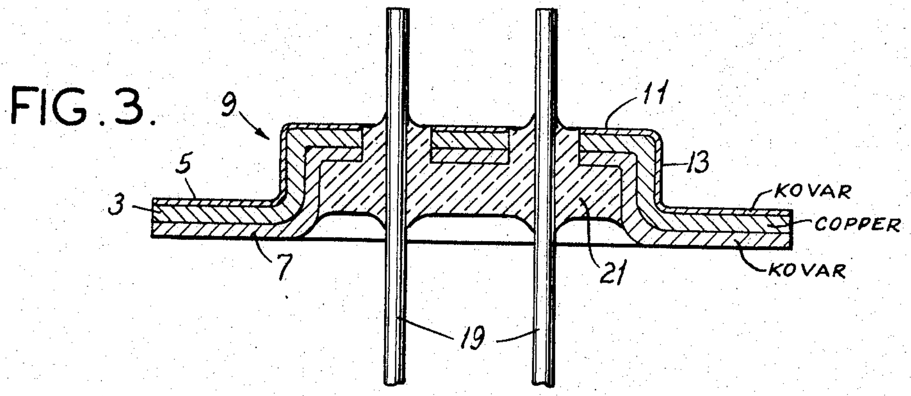
FIG. 3 is a section showing how the leads for a semiconductor device are sealed by sealing glass in openings in the header or eyelet.

Following the above-described processing of the header 9, and as shown in FIG. 3, two semiconductor leads each designated 19 are passed through openings 17 in the crown of the header, and sealed in place by providing a plug of sealing glass 21 in the cavity of the eyelet. Openings 17 are larger than the leads 19, and some of the glass flows into the spaces around the leads in the openings. The glass adheres to the surface of Kovar layer 7 as well as to the edge surfaces of the composite material around the opening 17 and hermetically seals the openings.

Figure 4:
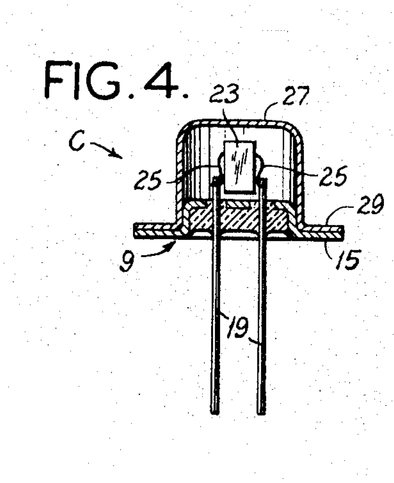
FIG. 4 is a section showing the FIG. 3 assembly assembled with a semiconductor device and a cover to form a capsule.

FIG. 4 shows a completed capsule C, including the header 9 with leads 19 secured thereto, a semiconductor element 23 over the header with connections 25 between the leads and the semiconductor element, and an inverted cup-shaped cover 27 telescoped down on the wall 13 of the header and having a rim 29 at its lower end bonded in suitable manner to rim 15 of the header to provide a hermetic seal therebetween.

As appears in FIG. 4, which shows a typical semiconductor device application, the thin Kovar layer 5 of the header when the unbalanced form of the material of this invention is used, would be on the side thereof to which the semiconductor element 23 is attached. With this arrangement, heat transfer from the semiconductor element occurs readily through the thin Kovar layer to the copper layer 3 for effective dissipation of the heat. Also, use of a thin layer 5 means less Kovar and more copper in the header, and lower cost since the cost of copper is substantially less than the cost of Kovar.

While the thickness proportion of layers 5, 3 and 7, for the unbalanced form of the invention, is above exemplified as 10/50/40, other proportions may be satisfactory. For example, we have also made the double-clad Kovar on copper sheets (and have made headers therefrom) having thickness proportions of 10/10/80, 10/20/70, 10/30/60, 10/40/50, and 10/60/30, each with a total thickness of about 0.0155 inch.

While in some applications, the unbalanced or unequal Kovar layer form described above is particularly desirable, there are other applications in which it is preferred that the Kovar layers be of equal thickness. For example, we have made sheets (and headers therefrom) in which the Kovar-copper-Kovar thickness proportions were 45/10/45, 40/20/40, 35/30/35 and 30/40/30, each with a total thickness of about 0.0155 inch. Use of layers of Kovar of equal thickness is more desirable from several standpoints, on account of commercial considerations than the unbalanced form. Bonding and fabrication of parts is more economical with material having Kovar layers of equal thickness than with unequal thickness, since inventory requirements for single thickness Kovar layers is less, and problems of identification of the thin or thick Kovar layer is avoided. Further, material with Kovar layers of equal thickness also provides the advantage of high thermal conductivity. Also, material having layers of Kovar of equal thickness may be more desirable than material having layers of Kovar of unequal thickness because the former may have less tendency to flex in thermostatic manner than the latter.

With regard to the double-clad Kovar on copper sheet material described above (either with Kovar layers of unequal thickness or Kovar layers of equal thickness), the optimum copper thickness is in the range from about 30% to 70% of the total thickness of the sheet. However, the copper thickness may range widely from about 1% to 98% of the total thickness of the sheet.

We may make the composite sheet material with the thickness of the copper such that the thermal coefficient of expansion of the composite material differs at most only slightly from the thermal coefficient of expansion of solid Kovar per se for use with glass sealants whose coefficient of thermal expansion matches or approximates that of Kovar per se. For optimum results in this regard, the thickness of the copper in the Kovar-copper-Kovar composite sealing material should be kept below about 60% of the total thickness of the composite material. On purely theoretical considerations, and assuming perfect elasticity of both components of the composite material, it would appear that the composite material should have a substantially different thermal coefficient of expansion than the Kovar per se, and such a coefficient that the thermal expansion of the header would be excessive in relation to the expansion of the sealing glass. However, contrary to what would normally be expected from such theoretical considerations, the thermal coefficient of expansion of the double-clad Kovar on copper composite material closely matches that of Kovar per se. While the reason for this phenomena is not definitely known, one theory which may account for the difference between the theoretical and actual expansions is that the materials are not perfectly elastic. Copper is soft compared to Kovar, and may yield plastically at elevated temperatures, thus generally following the expansion of the Kovar.

An additional advantage of the use of the double-clad Kovar sheet material is that it reduces undesirable thermal flexing or bending of the header. This is particularly true of sheet material in which the layers of Kovar are of substantially equal thickness, in which case substantially all thermal flexing is eliminated. A header made of single clad material (e.g., Kovar clad on one side with copper) is essentially a thermostatic bimetal, and may tend to flex or bend on change in temperature, and such bending or flexing may be sufficient to be detrimental to the glass seal.

The composite glass-sealing material may be made with a metal other than copper for the core. For example, a nickel bearing material (e.g., substantially pure nickel) or low carbon steel (e.g., 1010 steel) may be used as the core and, if cost is not a factor, silver (which has a thermal conductivity comparable with copper) or gold might be used. For Kovar, there may be substituted such glass sealing alloy materials as 42% nickel, balance iron; 52% nickel, balance iron; and 42% nickel, 6% chrome, balance iron. Also, the core itself may be a composite core, consisting, for example, of a layer of copper sandwiched between two layers of low carbon steel. See FIG. 5, wherein 31 designates the copper layer, 33 designates the steel layers, and 35 designates the layers of Kovar or the like. Here the Kovar layers are shown as of equal thickness.

As to the above-mentioned Kovar-low carbon steel-Kovar material, the thickness proportion depends in large measure on the ultimate application of the material. If it is to be used with sealing glass having a thermal coefficient of expansion matching that of the steel, the Kovar layers should be made relatively thin, the thickness of each Kovar layer preferably being in the range from about 1% to 20% of the total thickness of the material. On the other hand, if it is to be used with sealing glass having a thermal coefficient of expansion matching that of Kovar, the steel layer should be relatively thin, the thickness of the steel layer preferably being below about 20% of the total thickness of the material.

Figure 5:
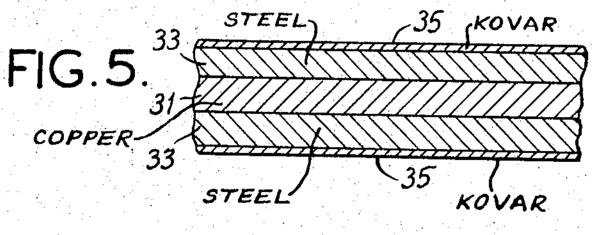
FIG. 5 is a section, with thickness greatly exaggerated, showing a modified version of the composite glass-sealing material.

As to the FIG. 5, five-layer Kovar-low carbon steel-copper-low carbon steel-Kovar material, examples of thickness proportions are: for ultimate use with glass having a thermal coefficient of expansion matching that of the steel, 5/30/30/30/5; for ultimate use with glass having a thermal coefficient of expansion matching that of Kovar, 25/10/30/10/25.

In view of the above, it will be seen that the several objects of the invention are achieved and other advantageous results attained.

As various changes could be made in the above constructions without departing from the scope of the invention, it is intended that all matter contained in the above descripion or shown in the accompanying drawings shall be interpreted as illustrative and not in a limiting sense.

What is claimed is:

1. A header for a capsule for a semiconductor element or the like, said header comprising a cup having an opening for passage therethrough of a conductor extending through the cup into the capsule, the cup being a composite multi-layered cup having an inner layer of a metallic glass-sealing material, an intermediate metallic core layer of a material having a relatively high thermal conductivity in relation to said glass-sealing material, and an outer layer of the same metallic glass-sealing material as the inner layer, said layers being metallurgically bonded together, and a mass of glass contained in the cup surrounding said conductor and sealing it in place, the glass being adhered to said inner layer of glass-sealing material, the glass-sealing material of said inner and outer layers having a thermal coefficient of expansion which substantially matches that of the glass, said intermediate core layer being protected on both faces by said inner and outer layers of glass-sealing material, the thermal coefficient of expansion of the composite multi-layer material of the cup closely matching that of the glass-sealing material per se, and the provision of the glass-sealing material on both faces of the intermediate core layer minimizing thermal flexing of the cup.

2. A header as set forth in claim 1 wherein the intermediate core layer is of copper, the inner and outer layers are of an alloy consisting of approximately 29% nickel, 17% cobalt and the balance iron, and the inner and outer layers are of substantially equal thickness substantially to eliminate thermal flexing of the cup.

3. A header as set forth in claim 2 wherein the thickness of the intermediate copper core layer is not more than about 60% of the total thickness of the composite material of the cup.

References Cited

UNITED STATES PATENTS 2,933,634 4/1960 Lederer ------------ 174—50.63
3,136,932 6/1964 Trent ------------ 174—50.63

LEWIS H. MYERS, *Primary Examiner.*

H. W. COLLINS, D. A. TONE, *Assistant Examiners.*